United States Patent [19]

Alves et al.

[11] Patent Number: 4,560,124

[45] Date of Patent: * Dec. 24, 1985

[54] RADIO CONVERSION PANEL

[75] Inventors: Roger J. Alves, 2538 E. Lynwood St., Simi Valley, Calif. 93065; Daniel W. Reyes, Northridge, Calif.

[73] Assignee: Roger J. Alves, Simi Valley, Calif.

[ * ] Notice: The portion of the term of this patent subsequent to Jul. 31, 2001 has been disclaimed.

[21] Appl. No.: 557,961

[22] Filed: Dec. 5, 1983

[51] Int. Cl.[4] .................................................. G12B 9/00
[52] U.S. Cl. .................................................. 248/27.1
[58] Field of Search ........................ 248/27.1, 27.3, 56, 248/57, 310, 311.2, 551, 244, 260, 258, DIG. 9, 300; 369/10, 11, 12; 361/422; 312/245; 206/191; 455/345

[56] References Cited

U.S. PATENT DOCUMENTS

| | | | |
|---|---|---|---|
| 2,821,566 | 1/1958 | Wiley | 455/345 |
| 3,384,987 | 5/1968 | Prechtl | 248/DIG. 9 |
| 3,799,483 | 3/1974 | Chiappinelli | 248/27.1 |
| 3,906,371 | 9/1975 | Tsuji . | |
| 3,922,047 | 11/1975 | Tsuji | 312/242 |
| 4,068,175 | 1/1978 | Maniaci | 455/345 |
| 4,313,584 | 2/1982 | Fukunaga | 248/27.3 |
| 4,378,099 | 3/1983 | Ikeda | 248/27.3 |
| 4,462,564 | 7/1984 | Alves et al. | 248/27.1 |

Primary Examiner—Ramon S. Britts
Assistant Examiner—Ramon O. Ramirez
Attorney, Agent, or Firm—William W. Haefliger

[57] ABSTRACT

A conversion kit for use between a vehicle radio housing and a front trim panel, and adapting to the panel and radio as well as to an instrument panel that receives radio, the kit comprising (a) a mounting panel having an opening therethrough to receive a frontwardly projecting portion of the radio housing, (b) and a multiplicity of generally L-shaped brackets having first legs with attachments to edge portions of the mounting panel to project rearwardly from a plane defined by the mounting panel, the brackets having second legs spaced rearwardly from said plane and extending generally parallel thereto, (c) the mounting panel and said brackets consisting of a one-piece unit, attachments of said first legs to said mounting panel edge portions having reduced thickness relative to the thicknesses of the mounting plate edge portions and of the bracket first legs whereby selected brackets may be bent or cut to sever their attachments to the mounting plate so that remaining brackets may be employed to secure the mounting plate in position.

15 Claims, 7 Drawing Figures

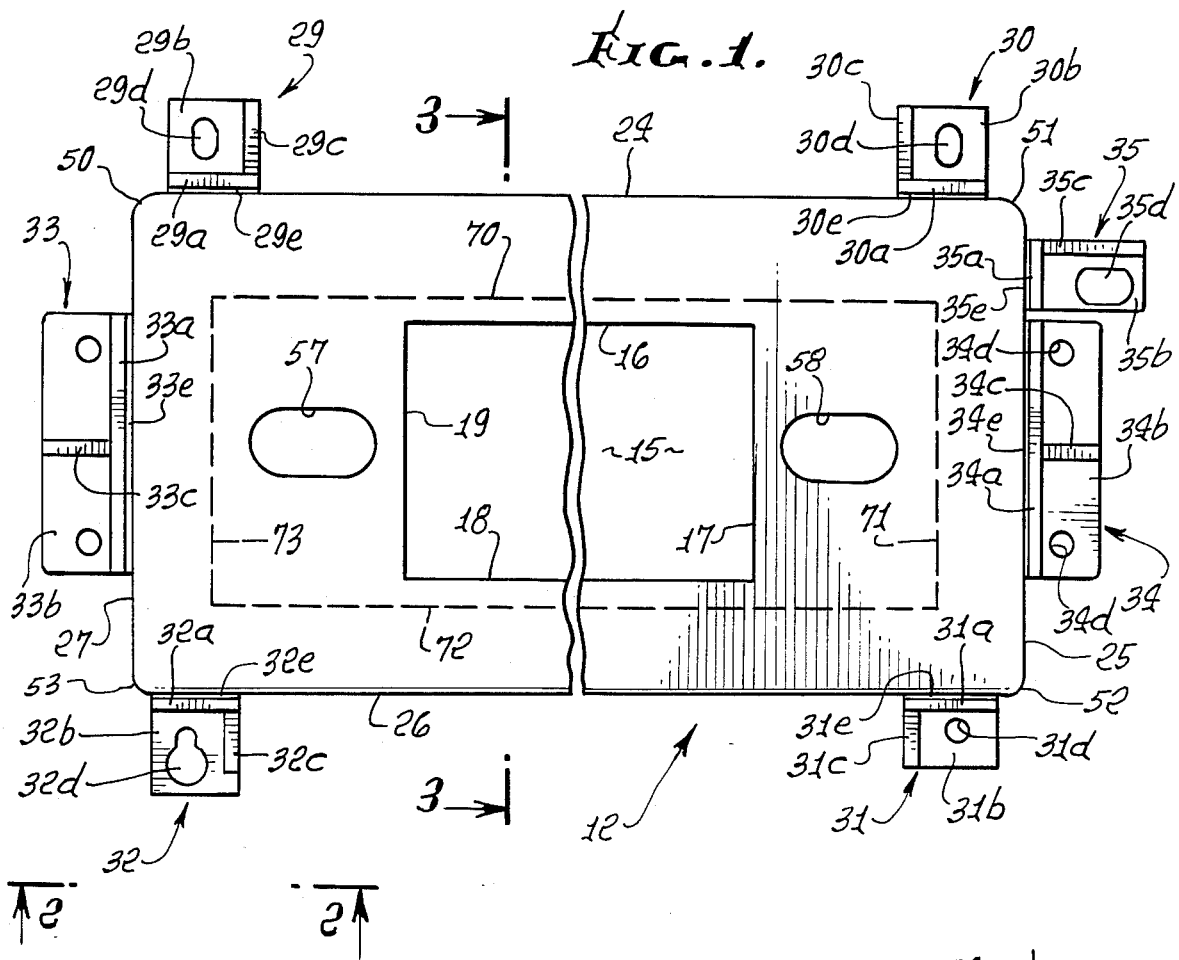
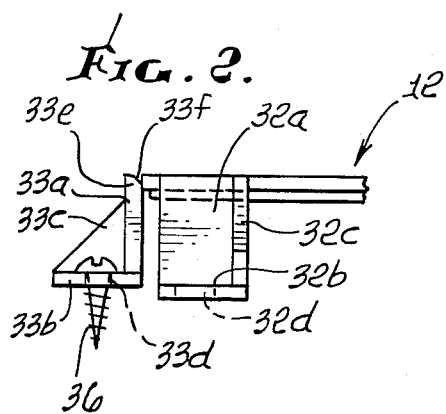
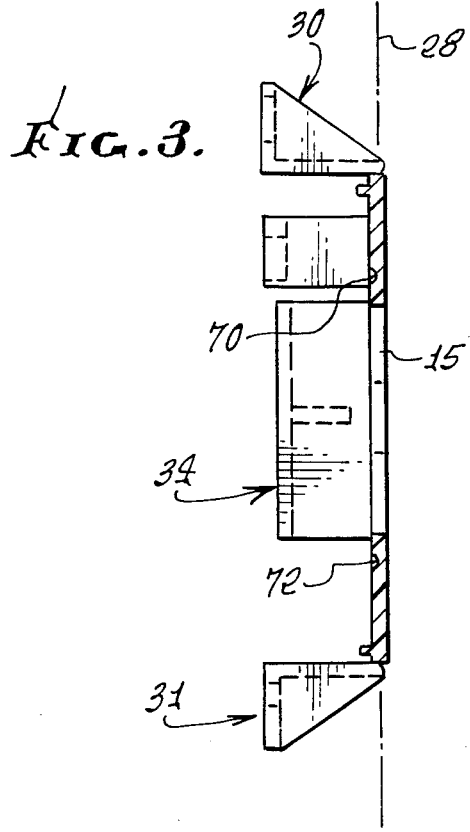
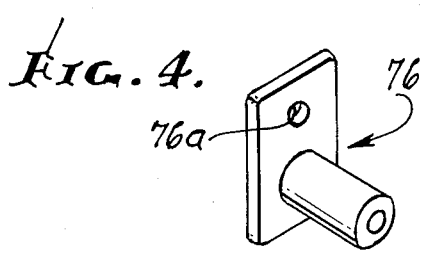

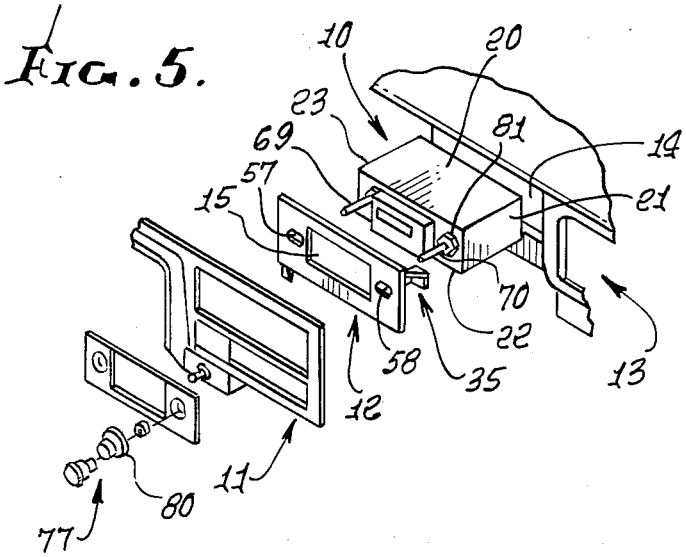
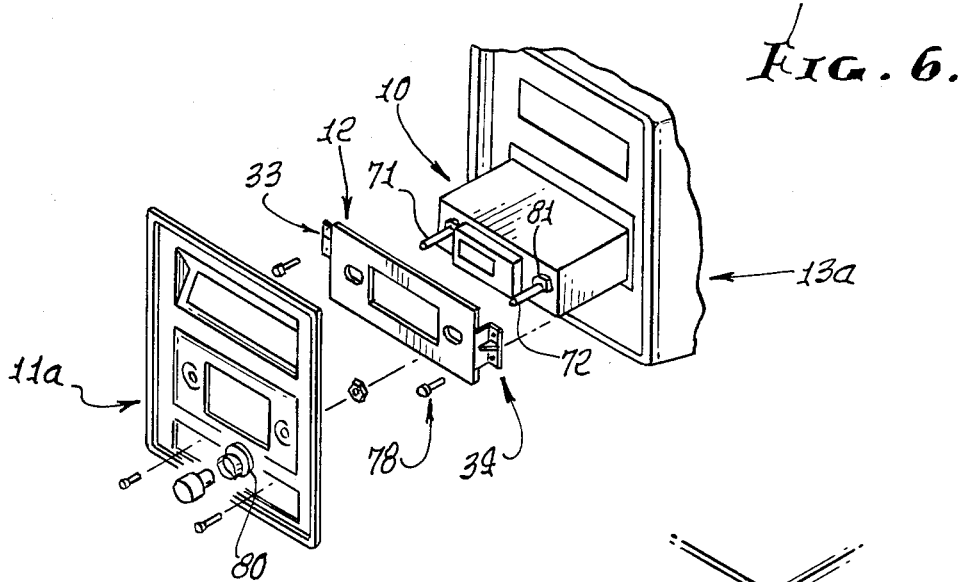
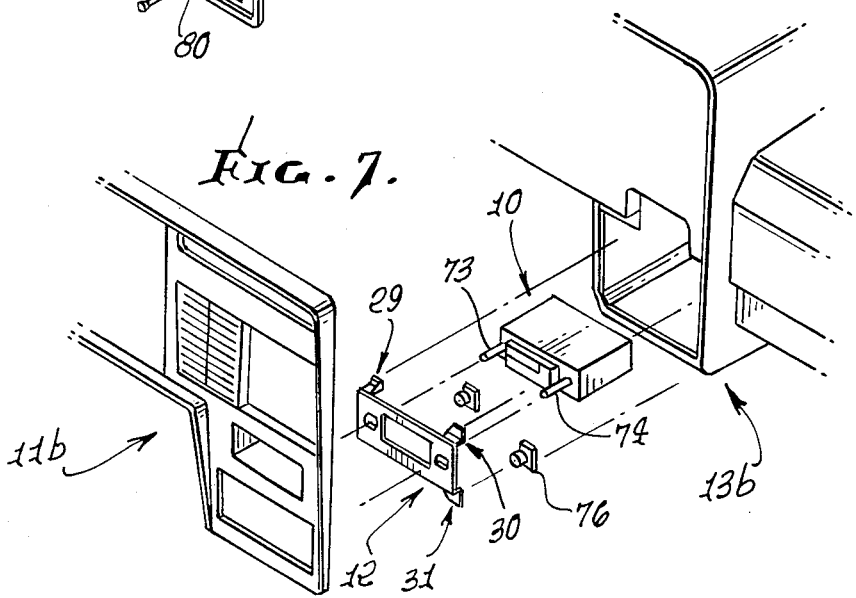

ered. Corners appear at 50-53.
RADIO CONVERSION PANEL

BACKGROUND OF THE INVENTION

This invention relates to a conversion kit to facilitate the mounting of substitute equipment such as a radio, tape player/equalizer in an automobile instrument panel, such equipment substituted for the original equipment radio.

It has become quite common in the contemporary automobile market for owners to want to substitute for the original equipment radio, (or dummy panel when the car comes equipped without a radio), that is in the car when new, a radio of a different type. Typically, the original equipment radio is mounted to be installed in a cavity in the instrument panel of the automobile, with a trim frame or panel around the control panel of the radio.

Present day automobiles differ in style and appearance including the size and location of the cavity in which the radio is installed. Conversion kits have been available wherein a frame is inserted into the cavity after the radio has been removed, to facilitate installation of a different radio. However, a large assortment of different conversion kits is necessary in order to fill the requirements of different automobiles having different instrument panel designs.

Thus, there is a strong need in the art for a conversion kit having the capability of serving its purpose in a large variety of different automobiles.

SUMMARY OF THE INVENTION

It is a major object of the invention to provide a simple yet universal conversion kit, which will meet the above need. Basically, the invention is embodied in a device which comprises:

(a) a mounting panel having an opening therethrough to receive a frontwardly projecting portion of the radio housing, (b) and a multiplicity of generally L-shaped brackets having first legs with attachments to edge portions of the mounting panel to project rearwardly from a plane defined by the mounting panel, the brackets having second legs spaced rearwardly from said plane and extending generally parallel thereto, (c) the mounting panel and said brackets consisting of a one-piece unit.

As will be seen, attachments of the first legs to the mounting panel edge portions may have reduced thickness relative to the thicknesses of the mounting plate edge portions and of the bracket first legs, whereby selected brackets may be bent to break their attachments to the mounting plate so that remaining brackets may be employed to secure the mounting plate in position.

As will appear, seven such brackets are typically provided to meet the need for universality; and all brackets may have frangible attachments to the mounting panel, whereby they may be selectively removed by bending about axes of attachment, the attachment design affording weakening to permit such bending and consequent breaking, yet being sufficiently sturdy to adequately support remaining or chosen brackets.

These and other objects and advantages of the invention, as well as the details of an illustrative embodiment, will be more fully understood from the following description and drawings, in which:

DRAWING DESCRIPTION

FIG. 1 is a front elevation of a conversion kit mounting panel with integrally attached brackets;

FIG. 2 is a fragmentary view taken on lnes 2—2 of FIG. 1;

FIG. 3 is a section taken on lines 3—3 of FIG. 1;

FIG. 4 is a perspective view of an auxiliary spacer usable with brackets seen in FIG. 1; and FIGS. 5, 6 and 7 are exploded perspective views showing alternatively selected uses of the FIG. 1 panel and brackets.

DETAILED DESCRIPTION

The conversion kit of the invention is usable between a vehicle radio housing, as for example is seen at 10 in FIG. 5, and a front trim panel indicated at 11 in FIG. 5. The kit includes a mounting panel 12, and brackets to be described, adapting to the radio housing 10 and to the front trim panel 11, as well as to an instrument panel 13 associated with the vehicle passenger compartment. The instrument panel 13 typically receives the radio as in a well 14.

Referring now to FIGS. 1, 2 and 3, the kit mounting panel 12 has a central rectangular opening 15 therethrough to receive a frontwardly projecting portion of the radio housing. Thus, the edges 16-19 of the rectangular opening conform to the radio housing sides 20-23, respectively. Panel 12 also has outer edges 24-27 defining its rectangular periphery. Edges 24 and 26 are longitudinally elongated, and edges 25 and 27 laterally elongated. Corners appear at 50-53.

Integrally attached to the panel, at its periphery, is a multiplicity of generally L-shaped brackets characterized as having first legs with attachments to edge portions of the panel 12 to project rearwardly from a plane (see plane 28 in FIG. 3) defined by the panel sheet. The brackets also have second legs spaced rearwardly from plane 28 and extending generally parallel thereto. Unusually advantageous brackets are shown at 29-35, and as having first legs 29a-35a, and second legs 29b-35b.

As shown, the brackets also include triangular outline reinforcing webs 29c-35c extending between and integral with the associated legs. Holes 29d-35d in the second legs 29b-35b are adapted to receive screw type fasteners (see for example a fastener 36 associated with hole 33d in leg 33b of bracket 33).

Like brackets 29-32 are located proximate corners 50-53, as shown.

The mounting panel and brackets consist of a one-piece unit; (typically of integrally molded plastic; and the brackets have attachments of their first legs to edge portions of the mounting panel. Such attachments may advantageously have by reduced thickness relative to the thicknesses of the plate edge portions carrying the brackets, whereby selected brackets (not to be used) may be bent at their attachments to the panel to break away from the mounting panel. The remaining and chosen brackets may then be employed to secure the mounting panel in position, via the fasteners positioned in the leg holes and screwed into the instrument panel or retainer associated therewith.

FIG. 2 shows the reduced thickness attachment 33e of leg 33e to panel edge portion 27a associated with panel lateral edge 27. Attachment 33e is elongated, as shown in FIG. 1, and is sufficiently sturdy (yet bendably breakable) to support the bracket to the panel when bracket 33 is chosen to remain attached to the panel in use. (See FIG. 6, for example). Weakening of the attachment is afforded by notch 33f, whereby the attachment has the form of a shear loaded web. Similarly, see reduced thickness attachments 29e and 30e connecting brackets 29 and 30 to panel edge portions 24a; and reduced thickness attachments 31e, 32e, 34e and 35e associated with bracket legs 31a, 32a, 34a and 35a, and panel edge portions 26a and 25a.

Note further that the fifth and sixth brackets 33 and 34 are alike, have attachments to the laterally elongated opposite edges 27 and 25, respectively, and generally mid-way between the corners 50 and 53, and 51 and 52, respectively. The seventh bracket 35 is attached to laterally elongated edge 25 between sixth bracket 34 and corner 51.

The mounting panel also includes two elongated through openings 57 and 58 to receive or pass radio control (i.e. operating) stems. See stems 69 and 70 in FIG. 5; stems 71 and 72 in FIG. 6; and stems 73 and 74 in FIG. 7.

In FIG. 5, the bracket 35 is attachable to the instrument panel 13 as via a retainer associated with hole 76 in the panel 11, a screw fastener being used for that purpose. Knobs are attachable to the stems 69 and 70, (see knob 77, for example, attachable to stem 70).

In FIG. 6, brackets 33 and 34 are chosen, and attached to the instrument panel 13a of different design than panel 11. See fasteners 78 to attach those brackets to the instrument panel. Other brackets are detached from the panel, as by bending about the elongation axes of the web attachments, as described above. A trim panel is seen at 11a.

In FIG. 7, brackets 29-32 are chosen for attaching the panel 12 to the instrument panel 13b, of still different design. A trim panel appears at 11b. Spacers 76' are also used between the brackets and the instrument panel 13b. Those spacers are attached to the panel 13b via fastening the fit in holes 76a. Tubular posts receive the fasteners that pass through the bracket and holes 29a-32a. See FIG. 4.

The trim panels are held in position, as via nuts 80 and 81 (see FIGS. 5 and 6) that attach to threaded fittings associated with the stems 69 and 70. See such fittings at 81 in FIGS. 5 and 6.

The panel and brackets may alternatively consist of stamped metal such as steel, or die cast metal such as zinc, aluminum or magnesium.

Finally, the rear side of the panel may have a rectangular groove therein (see groove extents 70'-73') about the opening 15 and spaced therefrom, whereby the opening may be optionally enlarged to the locus of lines 70-73 to fit a larger housing radio.

We claim:

1. In a conversion kit for use between a vehicle radio housing and a front trim panel, and adapting to the panel and radio as well as to an instrument panel that receives the radio, the kit comprising
  (a) a mounting panel having an opening therethrough to receive a frontwardly projecting portion of the radio housing,
  (b) and a multiplicity of generally L-shaped brackets having first legs with attachments to edge portions of the mounting panel to project rearwardly from a plane defined by the mounting panel, the brackets having second legs spaced rearwardly from said plane and extending generally parallel thereto,
  (c) the mounting panel and said brackets consisting of a one-piece unit, attachments of said first legs to said mounting panel edge portions having reduced thickness relative to the thicknesses of the mounting plate edge portions and of the bracket first legs whereby selected brackets may be bent or cut to sever their attachments to the mounting plate so that remaining brackets may be employed to secure the mounting plate in position.

2. The kit of claim 1 wherein said bracket second legs have fastener receiving holes therethrough.

3. The kit of claim 1 wherein said mounting plate is rectangular, and defines four corners, longitudinally elongated opposite edges and laterally elongated opposite edges, four of said brackets having attachments to said longitudinally elongated opposite edges proximate said corners.

4. The kit of claim 3 wherein fifth and sixth brackets have attachments to said laterally elongated panel opposite edges, respectively, and generally mid-way between the corners at the end of said sides.

5. The kit of claim 4 including a seventh bracket attached to one of said laterally elongated edges of the mounting bracket between one of said fifth and sixth brackets and one of said corners.

6. The kit of one of claims 1-5 wherein said attachments comprise linearly elongated plastic webs.

7. The combination of claim 1 wherein said mounting plate includes two elongated through openings to receive radio control operating stems.

8. The combination that includes the kit of one of claims 1-5 and 7 together with said front trim panel and said radio assembled with said mounting panel therebetween, certain of said brackets having been broken away from the mounting panel.

9. The combination that includes the kit of one of claims 1-5 and 7 together with said front trim panel and said radio assembled with said mounting panel therebetween, certain of said brackets having been broken away from the mounting panel, and including said instrument panel to which said kit, radio, and trim panel are assembled.

10. The combination of claim 1 wherein the brackets include reinforcement webs extending in planes normal to the first and second legs, the bracket second legs having through openings offset from said webs, to receive fasteners.

11. The combination of claim 1 wherein said opening is rectangular, and the panel having a rectangular groove therein about said opening and spaced therefrom, whereby said opening may be enlarged to the locus of said rectangular groove.

12. The combination of claim 1 wherein the panel and said brackets consist of molded plastic material.

13. The combination of claim 1 wherein the panel and brackets consist of stamped metal.

14. The combination of claim 1 wherein the panel and brackets consist of die cast material.

15. In a conversion kit for use between a vehicle radio housing and a front trim panel, and adapting to the panel and radio as well as to an instrument panel that receives the radio, the kit comprising
  (a) mounting panel having an opening therethrough to receive a frontwardly projecting portion of the radio housing,
  (b) and a multiplicity of generally L-shaped brackets adapted for use with different vehicle instrument panels, said brackets having first legs with attachments to edge portions of the mounting panel to project rearwardly from a plane defined by the mounting panel, the brackets having second legs spaced rearwardly from said plane and extending generally parallel thereto,
(c) the mounting panel and said brackets consisting of a one-piece unit,
(d) and including said radio housing projecting through said opening which is rectangular to closely receive said housing,
(e) the brackets adapted for connection to said instrument panel.

* * * * *